United States Patent
Barrenscheen et al.

(10) Patent No.: US 7,234,048 B2
(45) Date of Patent: Jun. 19, 2007

(54) METHOD FOR INITIALIZING OR CONFIGURING AN ELECTRICAL CIRCUIT

(75) Inventors: Jens Barrenscheen, München (DE); Achim Schmidt, Schiffweiler (DE)

(73) Assignee: Infineon Technologies AG, Munich (DE)

( * ) Notice: Subject to any disclaimer, the term of this patent is extended or adjusted under 35 U.S.C. 154(b) by 504 days.

(21) Appl. No.: 10/134,127

(22) Filed: Apr. 29, 2002

(65) Prior Publication Data

US 2002/0175725 A1 Nov. 28, 2002

Related U.S. Application Data

(63) Continuation of application No. PCT/DE00/03630, filed on Oct. 13, 2000.

(30) Foreign Application Priority Data

Oct. 28, 1999 (DE) ................. 199 52 034

(51) Int. Cl.
- *G06F 9/00* (2006.01)
- *G06F 15/177* (2006.01)
- *G06F 1/24* (2006.01)

(52) U.S. Cl. .................. 713/1; 713/2; 713/100
(58) Field of Classification Search .......... 713/2, 713/160, 1; 710/104; 711/220
See application file for complete search history.

(56) References Cited

U.S. PATENT DOCUMENTS

| | | | |
|---|---|---|---|
| 4,882,672 A | * 11/1989 | Yahiro | ............... 711/220 |
| 4,975,952 A | * 12/1990 | Mabey et al. | ............... 713/160 |
| 5,175,831 A | * 12/1992 | Kumar | ............... 713/2 |
| 5,452,424 A | 9/1995 | Goeppel | |
| 5,619,734 A | 4/1997 | Yabusaki | |
| 5,909,557 A | * 6/1999 | Betker et al. | ............... 710/104 |

FOREIGN PATENT DOCUMENTS

GB 2 270 782 A 3/1994

OTHER PUBLICATIONS

Systems Design and Architecture, Vincent P. Heuring and Harry F. Jordan, Copyright © 1997 Addison Wesley Longman, Inc., 6 pages.*

* cited by examiner

*Primary Examiner*—Rehana Perveen
*Assistant Examiner*—Stefan Stoynov
(74) *Attorney, Agent, or Firm*—Laurence A. Greenberg; Werner H. Stemer; Ralph E. Locher

(57) ABSTRACT

A method for initializing or configuring an electrical circuit, is described. The method includes reading data units stored in a memory device, using data contained in a first data unit part of the data units as a specification for use of data contained in a second data unit part of the data units, and carrying out the initialization or the configuration of the electrical circuit in a manner dependent on a content of an initialization control register contained in the electrical circuit. And in that during the initialization of the electrical circuit, the data read from the memory device can be written once or more often to the initialization control register.

9 Claims, 1 Drawing Sheet

METHOD FOR INITIALIZING OR CONFIGURING AN ELECTRICAL CIRCUIT

CROSS-REFERENCE TO RELATED APPLICATIONS

This application is a continuation of copending International Application No. PCT/DE00/03630, filed Oct. 13, 2000, which designated the United States and which was not published in English.

BACKGROUND OF THE INVENTION

Field of the Invention

The present invention relates to a method for initializing or configuring an electrical circuit using data stored in a memory device.

Electrical circuits are preferably constructed in such a way that they can be optimally adapted to the respective conditions of use with the least possible outlay. The requisite initialization or configuration of the relevant electrical circuit is effected for example by predetermined data being written to specific registers or memories of the circuit. In this case, the data that are to be written to the relevant registers or memories are usually stored in (preferably nonvolatile) memory devices.

In order that the data required for the initialization or configuration are read from the memory device storing them and are written to the corresponding registers or memories of the electrical circuit which is to be initialized or configured, a program-controlled unit, such as a microprocessor or microcontroller for example, which cooperates with or controls the electrical circuit must be provided within or outside the electrical circuit. The program-controlled unit reads the respectively required data from the memory device storing them and writes them to the corresponding registers or memories of the electrical circuit that is to be initialized or configured.

In the case of more complex initialization or configuration operations, an initialization or configuration program that is read out and executed by the program-controlled unit may also be stored in the memory device.

In this way, arbitrary electrical circuits can be individually initialized and configured.

However, an initialization or configuration that is effected in the manner described may be associated with a considerable outlay, in particular owing to the need for a program-controlled unit to be present. Although initializable or configurable circuits are often part of systems containing program-controlled units, this is not always the case or there is no connection between the program-controlled unit and the electrical circuit that is to be initialized or configured.

Although it is also possible for electrical circuits that are to be initialized or configured to be initialized without a program-controlled unit, this is limited to simple initializations and configurations which always remain the same.

SUMMARY OF THE INVENTION

It is accordingly an object of the invention to provide a method for initializing or configuring an electrical circuit which overcomes the above-mentioned disadvantages of the prior art methods of this general type, in which the electrical circuits which are to be initialized or configured can be initialized or configured as desired under all circumstances with minimal outlay.

With the foregoing and other objects in view there is provided, in accordance with the invention, a method for initializing or configuring an electrical circuit. The method includes reading data units stored in a memory device, using data contained in a first data unit part of the data units as a specification for use of data contained in a second data unit part of the data units, and carrying out the initialization or the configuration of the electrical circuit in a manner dependent on a content of an initialization control register contained in the electrical circuit. And in that during the initialization of the electrical circuit, the data read from the memory device can be written once or more often to the initialization control register.

Accordingly, it is provided that, from data units read from the memory device, data respectively contained in a first data unit part are used as a specification for the use of data contained in a second data unit part.

As a result, the initialization or configuration of the electrical circuit that is to be initialized or configured can be effected by the latter itself without appreciable outlay, in particular without a program-controlled unit. For this purpose, the electrical circuit which is to be initialized or configured merely has to contain a logic configuration that extracts and executes the specification, and, on account of the very limited number and low complexity of the specifications, the logic configuration can be constructed and be able to be operated very simply. Possible changes that have to be made to the initialization or configuration sequence and/or the data to be used in the process can be effected by exchange or reprogramming of the memory device.

The novel method makes it possible for electrical circuits to be initialized or configured as desired under all circumstances with minimal outlay.

In accordance with an added mode of the invention, there is the step of writing the data contained in the second data unit part to a storage device, selected from the group consisting of a memory and a register, contained in the electrical circuit.

In accordance with an additional mode of the invention, there is the step of defining the storage device to which the data contained in the second data unit part are to be written by taking account of the data contained in the first data unit part.

In accordance with another mode of the invention, there is the step of using the data contained in the first data unit part as an address designating the storage device to be written to.

In accordance with a further mode of the invention, there is the step of setting up each of the data units with a variable length, so that the data units that are read out successively may have different lengths.

In accordance with a further added mode of the invention, there is the step of varying a length of the second data unit part in a manner dependent on the storage device that is to be written to.

In accordance with a further additional mode of the invention, there is the step of providing each of the data units used with information about a length of a respective data unit.

In accordance with another further mode of the invention, there is the step of providing each of the data units used with a third data unit part containing test data that can be used to at least one of detect and correct transmission errors.

In accordance with a concomitant mode of the invention, there is the step of providing each of the data units used with information about whether or not a respective data unit has a data unit part containing the test data.

Other features which are considered as characteristic for the invention are set forth in the appended claims.

Although the invention is illustrated and described herein as embodied in a method for initializing or configuring an electrical circuit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
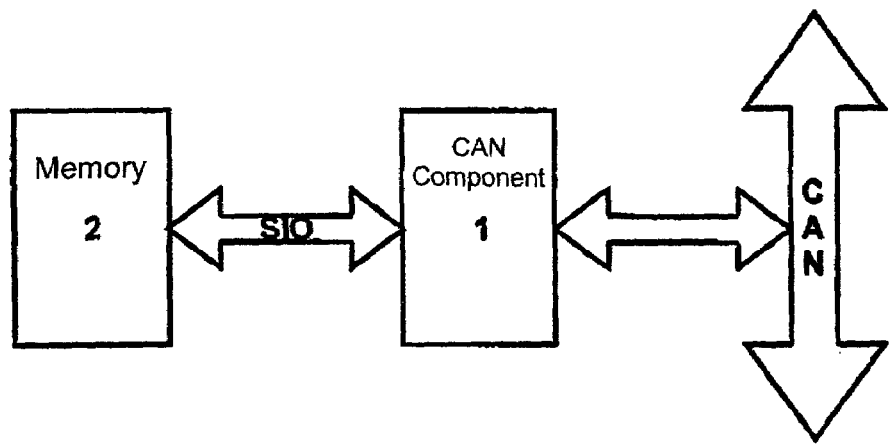
FIG. 1 is a block diagram of an electrical circuit that can be initialized or configured in the manner described below and according to the invention.

Referring now to the figures of the drawing in detail and first, particularly, to FIG. 1 thereof, there is shown an electrical circuit which is to be initialized or configured by the method described in more detail below. The electrical circuit is a controller area network (CAN) component in the example considered. However, it shall already be pointed out at this juncture that there is no restriction thereto. The electrical circuit to be initialized or configured may also be any other electrical circuit desired.

In the example considered, the CAN component need not have a program-controlled unit, i.e. a microprocessor, microcontroller or the like, and, moreover, need not be connected to a program-controlled unit which controls it. No program-controlled unit is required for carrying out the method described in more detail below. Although the use of the method described in more detail below proves to be particularly advantageous in the case of electrical circuits of this type, there is also no restriction thereto. In other words, the electrical circuit may also contain a program-controlled unit or be connected to a program-controlled unit. Although a program-controlled unit that is present does not have to be used for the purpose of initialization or configuration of the CAN component, it can nonetheless be (concomitantly) used for the purpose. In this case, however, the outlay that has to be expended for this and the burden on the program-controlled unit are considerably lower than when previous methods for initializing or configuring electrical circuits are performed using program-controlled units.

In the example considered, the electrical circuit that is to be initialized or configured is initialized or configured using data stored in a memory device. The electrical circuit reads out data stored in the memory device and writes them to predetermined internal registers or other memories of the electrical circuit.

In the example considered, the memory device is an EEPROM. However, any other nonvolatile or volatile memory device desired, such as, for example, a ROM, a flash memory, a RAM, etc. may also be involved.

In the example considered, the memory device is a memory device configured for serial data transfers (the EEPROM used as memory device is an SPI-compatible EEPROM; the EEPROM is accessed through an SSC unit of the CAN component). However, a memory device configured for parallel data transfers may also be involved.

The configuration considered is illustrated diagrammatically in FIG. 1. In this case, the CAN component is designated by the reference symbol 1, the EEPROM is designated by the reference symbol 2, the connection configured for serial data transfer between the CAN component 1 and the EEPROM 2 is designated by the reference symbol SIO, and the CAN is designated by the reference symbol CAN.

If, after switch-on or in response to other events, the CAN component 1 must be initialized or (re)configured, it begins to read data serially from the EEPROM 2.

Figure 2:
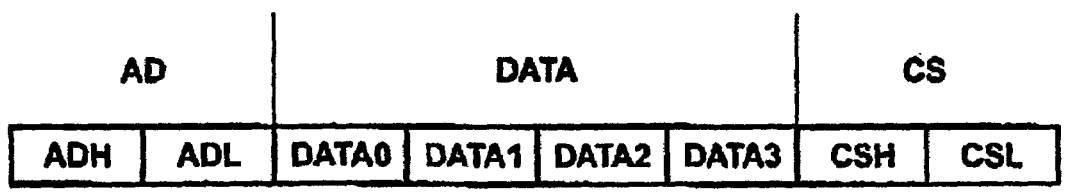
FIG. 2 is a block diagram showing a format of a data unit which is used to initialize or configure the electrical circuit.

The data read from the EEPROM 2 are read out and processed further in units whose format is illustrated in FIG. 2.

As can be seen from FIG. 2, a data unit contains a plurality of parts, namely an address part AD, a data part DATA, and a test part CS.

In the example considered, the address part AD contains two bytes ADL and ADH which contain specifications for the use of the data contained in the data part DATA (bits 0 to 7 of ADL and bits 0 to 3 of ADH). In the example considered, the specification is a loading specification for the loading of the registers or memories of the electrical circuit that is to be initialized or configured with the data provided for this. In the example considered, it contains the address of the register or memory to which the data contained in the data part DATA are to be written. In addition, or as an alternative, however, the specification could, for example also contain simple processing of the data contained in the data part DATA. The address part AD additionally contains an indication of how many bytes the data part DATA contains (bits 5 to 7 of ADH). The address part AD further contains an indication of whether the test part CS is present (bit 4 of ADH).

In the example considered, the data part DATA contains between 1 and 4 bytes. The data stored therein are written to the register or memory that is specified by the address indicated in the address part AD.

The test part CS is optional. In the example considered, it contains 2 bytes and contains a check sum which can be used to detect and, if appropriate, correct errors in the relevant data unit which have occurred during the data transmission.

The CAN component 1 reads one data unit after the other from the EEPROM 2, checks them for correctness if appropriate using the test part CS, and writes the configuration data contained therein (in the data part DATA) to the internal registers or memories which are specified in the address part AD.

The decoding of the address and the writing of data to the location specified by the address within the CAN component 1 requires only an extremely simple logic configuration which can be integrated without difficulty and with minimal outlay into electrical circuits which are to be initialized or configured.

As a result, in contrast to the prior art, it is no longer necessary for the initialization or configuration of an electrical circuit that is to be initialized or configured to be implemented using a program-controlled unit, such as a microprocessor or microcontroller for instance. The electrical circuit that is to be initialized or configured can initialize or configure itself without difficulty.

If it is necessary to alter the data which are to occupy the registers or memories of the electrical circuit and/or the order in which this is to be done, all that is necessary is to reprogram or exchange the EEPROM 2; no interventions are necessary in the circuit which is to be initialized or configured.

Figure 3:
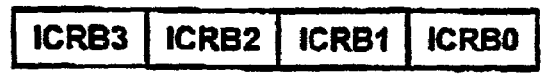
FIG. 3 is a block diagram showing an initialization control register of the electrical circuit.

An initialization or configuration of the CAN component 1 that is affected in the manner described can also contain more complex operations. In such cases, in particular, it proves to be advantageous if the CAN component 1 is provided with an initialization control register that controls the initialization or configuration. An exemplary embodiment of such a register, to which, preferably, data read from the EEPROM can likewise be written, is shown in FIG. 3.

In the example considered, the initialization control register contains four bytes ICRB0, ICRB1, ICRB2, ICRB3 and contains:
a) the address using which the memory device (the EEPROM 2 in the example considered) containing the configuration data is to be addressed IRCB0 and IRCB1,
b) an instruction word (IRCB2) to be communicated to the memory device, and
c) various items of control information in particular for the sequence of the initialization or configuration IRCB3.

In the example considered, the items of control information prescribe:
a) whether the initialization phase is to be ended,
b) whether the initialization is to be continued by an access to the memory device which is effected using the data contained in IRCB0–IRCB2, and
c) whether the registers of the SSC unit are to be written to anew (for example, with the contents of ICRB0 to ICRB2).

It should be apparent that the initialization control register can contain diverse further items of information and instructions for the initialization or configuration. Since the data stored in the memory device can be written to the initialization control register, the sequence of the initialization or configuration can be defined without the execution of a program, that is to say extremely simply, but nevertheless completely flexibly.

The above-described type of initialization or configuration of electrical circuits can be effected without using a program-controlled unit, as has already been mentioned above; generally, a logic configuration constructed in a comparatively simple manner, for example a so-called state machine, suffices for carrying it out. This also applies to complex and/or very extensive initialization or configuration operations. In this case, it is even possible, without a relatively high outlay, for the sequence of the initialization or configuration to be made dependent on specific events or states within or outside the electrical circuit that is to be initialized or configured (for example on the level of a signal fed to the circuit).

Independently of this, it is possible—without special adaptation of the construction and/or of the operation of the electrical circuit which is to be initialized or configured or of other system components—to use memory devices of any desired size and/or any desired organization for storing the data required for the initialization or configuration. Special features of the memory device used which may have to be taken into consideration can be taken into account by entries in the initialization control register which are made at the beginning of the initialization or configuration and/or before the occurrence of the special features.

In the present case, where the circuit which is to be initialized or configured is a network component, it may be provided that "only" the basic configuration—necessary for the start-up—of the electrical circuit is performed in the manner described above, and that the network component is subsequently configured further via the network (in the example considered: via the CAN)

In the manner described above, electrical circuits can be optimally adapted to the given conditions or requirements under all circumstances with minimal outlay.

We claim:

1. A method for initializing or configuring an electrical circuit, which comprises the steps of:
   reading data units stored in a memory device;
   using data contained in a first data unit part of the data units as one of:
   (a) an address of a register or a memory to which data contained in a second data unit part of the data units are to be written; and
   (b) an indication of how the data contained in a second data unit part of the data units are to be processed; and
   carrying out the initialization or the configuration of the electrical circuit in a manner dependent on a content of an initialization control register contained in the electrical circuit, and in that during the initialization of the electrical circuit, the data read from the memory device can be written once or more often to the initialization control register.

2. The method according to claim 1, which comprises writing the data contained in the second data unit part to a storage device, selected from the group consisting of a memory and a register, contained in the electrical circuit.

3. The method according claim 2, which comprises defining the storage device to which the data contained in the second data unit part are to be written by taking account of the data contained in the first data unit part.

4. The method according to claim 3, which comprises using the data contained in the first data unit part as an address designating the. storage device to be written to.

5. The method according to claim 1, which comprises setting up each of the data units with a variable length, so that the data units that are read out successively may have different lengths.

6. The method according to claim 5, which comprises varying a length of the second data unit part in a manner dependent on the storage device which is to be written to.

7. The method according to claim 5, which comprises providing each of the data units used with information about a length of a respective data unit.

8. The method according to claim 1, which comprises providing each of the data units used with a third data unit part containing test data that can be used to at least one of detect and correct transmission errors.

9. The method according to claim 8, which comprises providing each of the data units used with information about whether or not a respective data unit has a data unit part containing the test data.

* * * * *